United States Patent [19]
Littlefield et al.

[11] Patent Number: 6,011,382
[45] Date of Patent: Jan. 4, 2000

[54] CIRCUIT AND METHOD FOR DIRECTLY REGULATING THE OUTPUT VOLTAGE OF AN ELECTROLUMINESCENT LAMP DRIVER

[75] Inventors: Troy J. Littlefield; Dan Fleming, both of Colorado Springs, Colo.

[73] Assignee: Toko, Inc., Japan

[21] Appl. No.: 09/164,806

[22] Filed: Oct. 1, 1998

[51] Int. Cl.[7] ......................................... G05F 1/10
[52] U.S. Cl. ............................ 323/222; 323/283; 323/288
[58] Field of Search ..................................... 323/222, 288, 323/284, 283

[56] References Cited

U.S. PATENT DOCUMENTS

| | | | |
|---|---|---|---|
| 5,001,620 | 3/1991 | Smith | 363/89 |
| 5,463,283 | 10/1995 | Sanderson | 315/209 R |
| 5,650,925 | 7/1997 | Hesterman | 363/132 |
| 5,717,317 | 2/1998 | Pleso | 323/222 |
| 5,838,181 | 11/1998 | Hesterman | 327/175 |
| 5,867,379 | 2/1999 | Maksimovic et al. | 323/222 |

*Primary Examiner*—Shawn Riley
*Attorney, Agent, or Firm*—William E. Hein

[57] ABSTRACT

An EL lamp driver employs constant power regulation rather than pulse frequency modulation to thereby eliminate the high voltage resistive divider network present in prior art EL lamp drivers that employ pulse frequency modulation.

12 Claims, 5 Drawing Sheets

CIRCUIT AND METHOD FOR DIRECTLY REGULATING THE OUTPUT VOLTAGE OF AN ELECTROLUMINESCENT LAMP DRIVER

BACKGROUND AND SUMMARY OF THE INVENTION

This invention relates generally to electroluminescent (EL) lamp drivers and, more particularly, to a circuit and method for indirectly regulating the output voltage of such EL lamp drivers.

The prior art direct method of controlling the output voltage of an EL lamp driver involves first measuring the output voltage and comparing it to a reference voltage. Then, the error signal generated by the difference between those two voltages is employed in a negative feedback control circuit to regulate the output voltage. A typical prior art EL lamp driver circuit and the external components required to properly power an EL panel, are illustrated in FIG. 1. This prior art circuit converts a low battery voltage (1.5–12.0 volts) supplied by a battery 101 to a high AC voltage (60–180 volts) that is used to drive a fixed capacitive load 105 of an EL lamp panel 105. This high AC voltage level applied across the EL lamp panel is the primary factor in determining the brightness of the EL panel. The changes in light intensity due to small output voltage changes are typically minimally perceptible to the eye.

Exemplary of the commercially available prior art EL lamp drivers 100 of FIG. 1 are the HV803 from Suptertex, Inc., the IMP803 from IMP, Inc., and the similar circuits described in U.S. Pat. Nos. 5,463,283 and 5,717,317. A typical block diagram of these prior art lamp drivers of FIG. 1 is shown in FIG. 2. The circuit of FIG. 2 comprises a boost converter section 209 and an H-bridge driver section 210. A detailed circuit diagram of the boost converter section 209 is illustrated in FIG. 3. In operation, a switch oscillator 200 drives a FET switch 201 to its on state for a fixed duty cycle of 88%. During the on time of the switch 201, energy is being stored in an inductor 102, and during the off time, this stored energy is substantially transferred to an output capacitor 103 through a catch diode 104. As energy builds in capacitor 103, the voltage V(OUT) across the capacitor 103 rises. Regulation of V(OUT) occurs when it rises above the regulation voltage such that the voltage presented at the mid-point of the voltage divider resistors 205, 206 is equal to the voltage V(REF) 207. At this point the comparator 208 changes state and disables the switch oscillator 200. The energy in the output capacitor 103 is then discharged by the H-bridge load 309, until the voltage V(OUT) decays below the regulation voltage, causing the switch oscillator 200 to again recharge the output capacitor 103. The regulation method employed in the prior art HV803 and IMP803 EL lamp drivers is known as pulse frequency modulation (PFM). PFM switching regulators are disadvantageous in that they can cause radio frequency interference (RFI) problems in wireless communication systems due to the fact that their switching operation tends to be somewhat random, depending on the input voltage of the battery power source.

The resistive divider comprising resistors 205, 206 is employed to sense the output voltage of the prior art boost converter of FIG. 3. The large amount of silicon required to fabricate this resistive divider in an integrated circuit adds to its expense and size. In addition, due to the high conversion ratio between the input and output voltages of the boost converter, the current drain through resistors 205, 206 is greatly multiplied at the input power source, thereby reducing the overall efficiency of the boost converter.

In an EL lamp driver application in which the frequency of lamp operation and the output voltage are set, the load current flowing into the H-bridge load is very predictable and relatively constant. Precise regulation of the output voltage is not necessary, because the small change in light intensity of the EL panel resulting from a small change in output voltage caused by component inaccuracies is imperceptible to the user.

It would therefore be advantageous to provide an improved EL lamp driver that takes advantage of the fact that relatively small changes in output voltage do not result in noticeable changes in light intensity of the EL panel being driven. It would also be advantageous to provide an improved EL lamp driver that employs pulse width modulation (PWM) rather than pulse frequency modulation (PFM) as a regulation technique to thereby minimize the resulting RFI. Also, elimination of the high voltage resistive divider network of the prior art greatly reduces the silicon area required when fabricating the EL lamp driver as an integrated circuit. Such an improved EL lamp driver could thereby be fabricated as a more compact integrated circuit that would operate more efficiently than the integrated circuit EL lamp drivers known in the prior art.

DESCRIPTION OF THE PREFERRED EMBODIMENTS

In a constant power DC-DC boost converter in which the output voltage is much larger that the input voltage, the output power can be approximated as the product of the energy stored in the inductor and the frequency of operation of the boost switch. This relationship can be described by the equation $V(OUT)*I(OUT)=(\frac{1}{2})*L*I(peak)**2*f(switch)$, assuming that all of the current provided by the boost converter is used to charge the EL panel capacitance. The foregoing equation will hereinafter be referred to as equation 1. Given the fact that the EL panel must have a charge defined as $C(lamp)*V(OUT)$ delivered to it twice during each clock cycle, it can be said that $I(OUT)=I$ (into the bridge driver of EL lamp)$=2*f(lamp)*C(lamp)*V(OUT)$. This equation will hereinafter be referred to as equation 2. By substituting I(OUT) from equation 2 in equation 1 and solving for V(OUT), it follows that $V(OUT)=[L*f(switch)*I(peak)**2/(4*C(lamp)*f(lamp))]**0.5$, where f(lamp) is to be counted down from f(switch) such that the quantity $f(switch)/f(lamp)$ is a constant K. Therefore, $V(OUT)=0.5*(K*L/C(lamp))**0.5*I(peak)$. This equation will hereinafter be referred to as equation 3. It should be noted that V(OUT) can be substantially regulated by controlling I(peak) for a fixed value of L and C(lamp).

Figure 1:
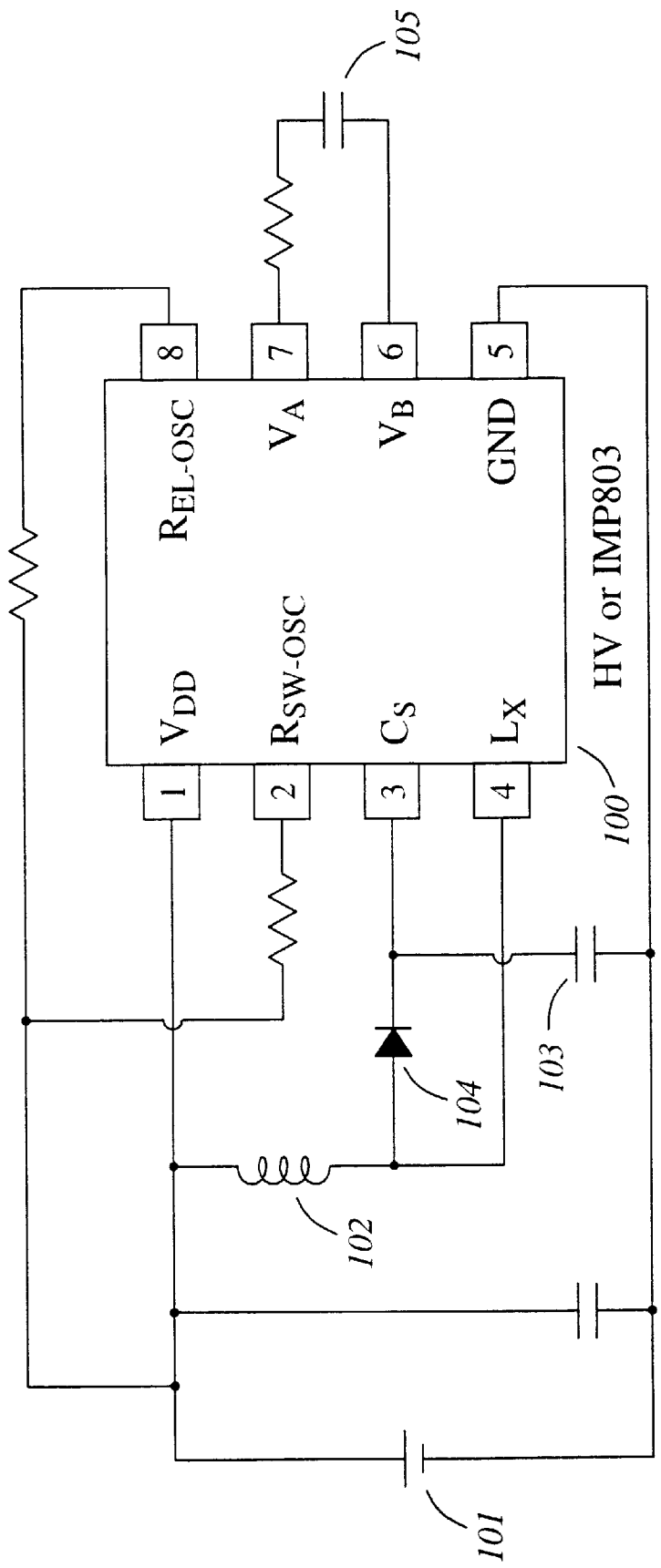
FIG. 1 is a circuit diagram illustrating a typical prior art electroluminescent (EL) lamp driver and the external components required for powering an EL panel.
Figure 2:
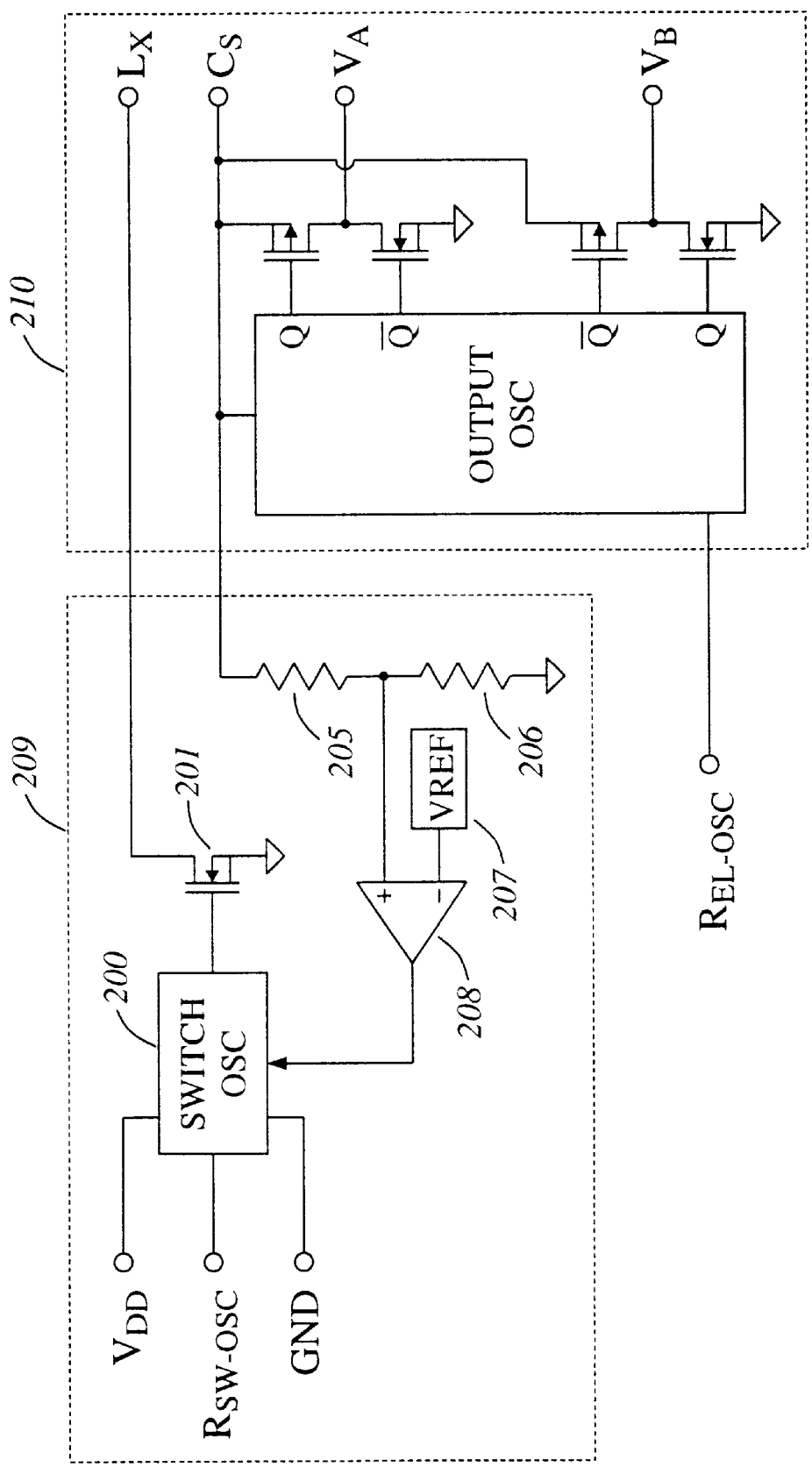
FIG. 2 is a detailed block diagram of the prior art EL lamp driver circuit of FIG. 1.
Figure 3:
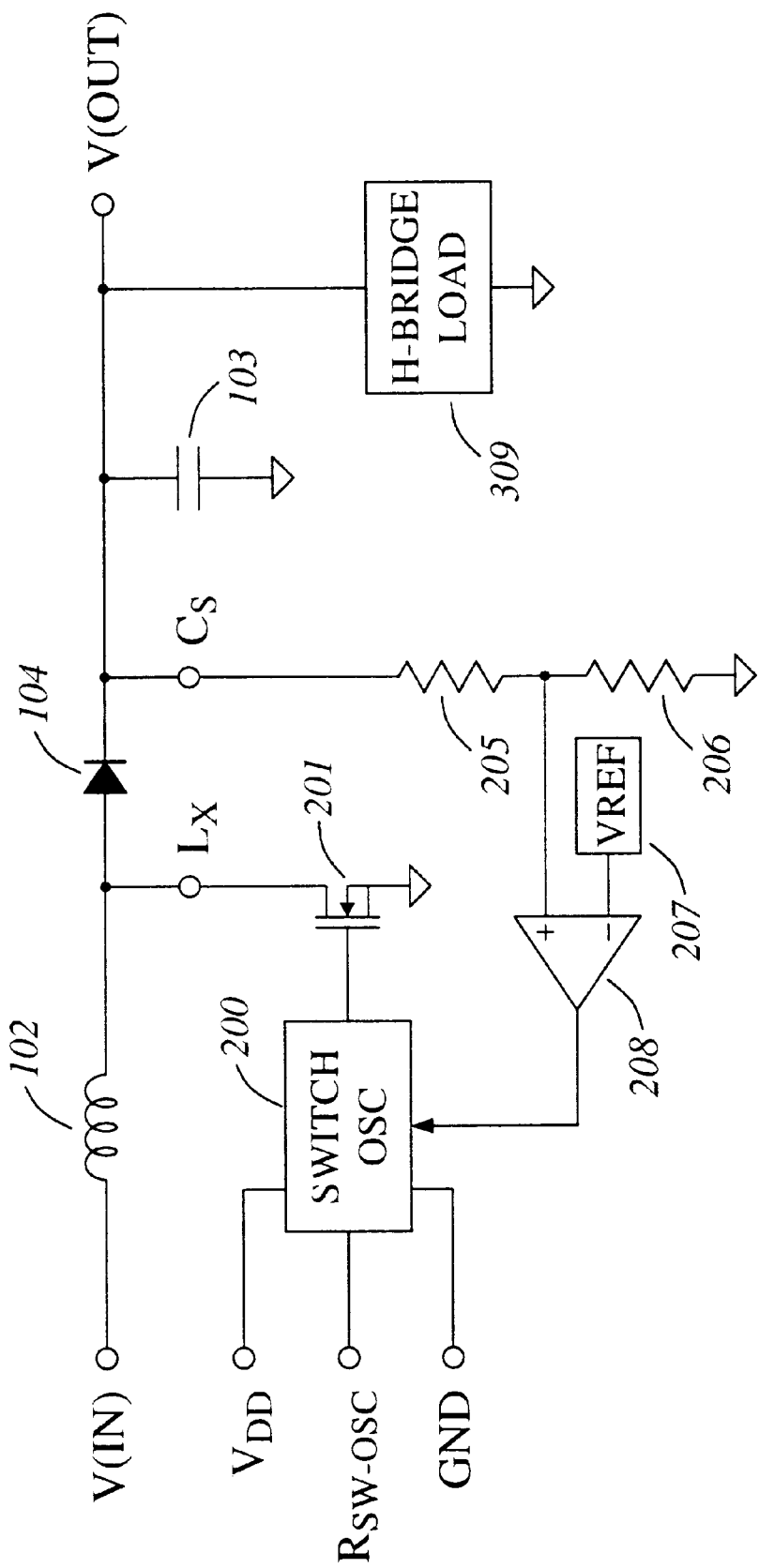
FIG. 3 is a detailed circuit diagram of the boost converter section of the prior art EL lamp driver of FIG. 2.
Figure 4:
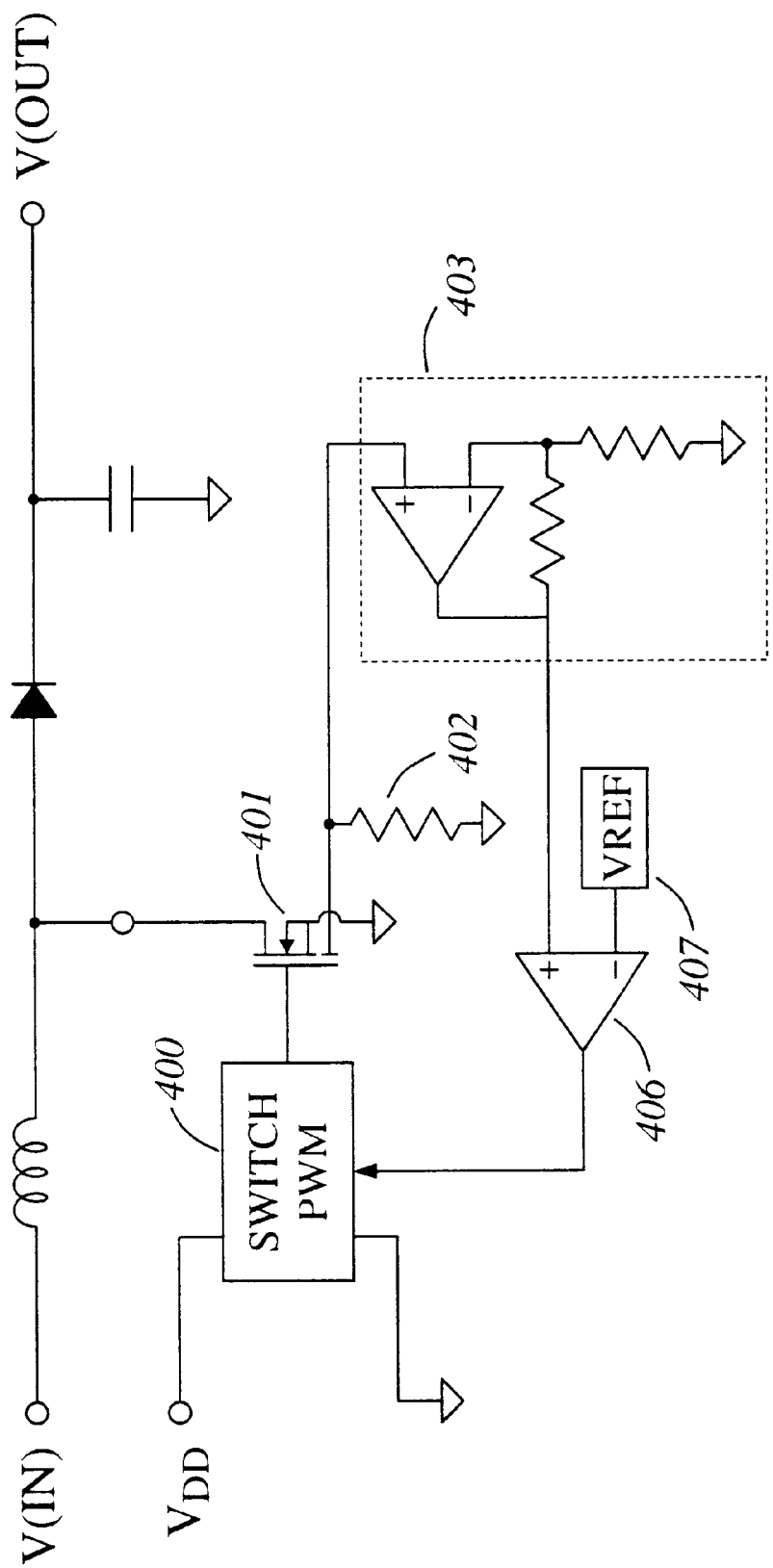
FIG. 4 is detailed schematic diagram of an EL lamp driver circuit in accordance with a first embodiment of the present invention in which peak current regulation is employed.

Referring now to FIG. 4, there is shown a boost converter section of an EL lamp driver circuit in accordance with a first embodiment of the present invention, in which peak current regulation is employed. A switch PWM 400 is powered by a voltage V(DD) that may be derived from input voltage source V(IN) or from some external voltage source. Switch PWM 400 controls the on and off times of the boost converter section illustrated in FIG. 4. A proportional current signal provided by a sense FET 401 is fed through a resistor 402. The current flowing through resistor 402 develops a voltage that is representative of the current flowing through sense FET 401. This voltage is amplified by a non-inverting amplifier circuit 403 and compared to a reference voltage 407 by means of a comparator 406. When the current flowing in sense FET 401 reaches a predetermined peak value that results in a change in the state of comparator 406, the on-time pulse supplied by switch PWM 400 is terminated, and the switch PWM 400 is latched off until the next clock pulse is issued by switch PWM 400. Other circuit configurations may be chosen to perform the current sensing function described above. The foregoing method of modulating the termination of the on-time pulse issued by switch PWM 400 within the period of one constant frequency clock cycle is commonly referred to as pulse width modulation (PWM). This method of regulation accomplishes line voltage regulation by increasing the pulse width duty cycle as the input voltage V(IN) decreases.

The present invention is notable in that it effectively controls the output voltage V(OUT) without directly measuring it. As stated hereinabove, prior art EL lamp driver circuits directly measure the output voltage by means of a resistive divider which requires large amounts of silicon for integrated circuit implementation. Because EL lamp driver circuits supply a high output voltage, the current flowing through the resistive divider is greatly multiplied at the input, thereby rendering these prior art circuits inefficient. By eliminating the resistive dividers of prior art EL lamp driver circuits, the present EL lamp driver circuit is more efficient and can be fabricated in a smaller integrated circuit package at a lower cost.

As can be appreciated with reference to the foregoing equation 3, a change in the capacitance of the EL lamp panel through the aging process or through use of a panel of different size requires changing the value of the inductor L or the setting of the peak current I(peak) in order to maintain the same output voltage V(OUT). This can be accomplished by any of a number of known techniques. For example, the gain of the non-inverting amplifier 403 by trimming, by some adjustment means at the time the circuit is powered up, or by any of a number of other well known techniques. Alternatively, the value of V(REF) 407 may be changed. In addition to these internal circuit methods of setting the current I(peak), one may choose a method of setting I(peak) by using external components to thereby vary the intensity of the EL lamp panel.

The EL lamp driver circuit of FIG. 4 does not provide for load regulation, since it is not required in order to maintain substantially constant output current for a given output voltage during steady state operation. However, in the absence of an EL panel load, the output voltage V(OUT) will rise to an unacceptable level. Therefore, some conventional method of over-voltage protection is required under such a no-load condition.

The EL lamp driver circuit of FIG. 4 employing peak current regulation is advantageous over prior art circuits that employ pulse frequency modulation (PFM) in that it employs fixed frequency PWM operation to minimize RFI problems, provide current limit protection, and lower controlled peak currents in the boost switch and inductor, which translates into higher efficiency and a reduced likelihood of saturation of the inductor.

Figure 5:
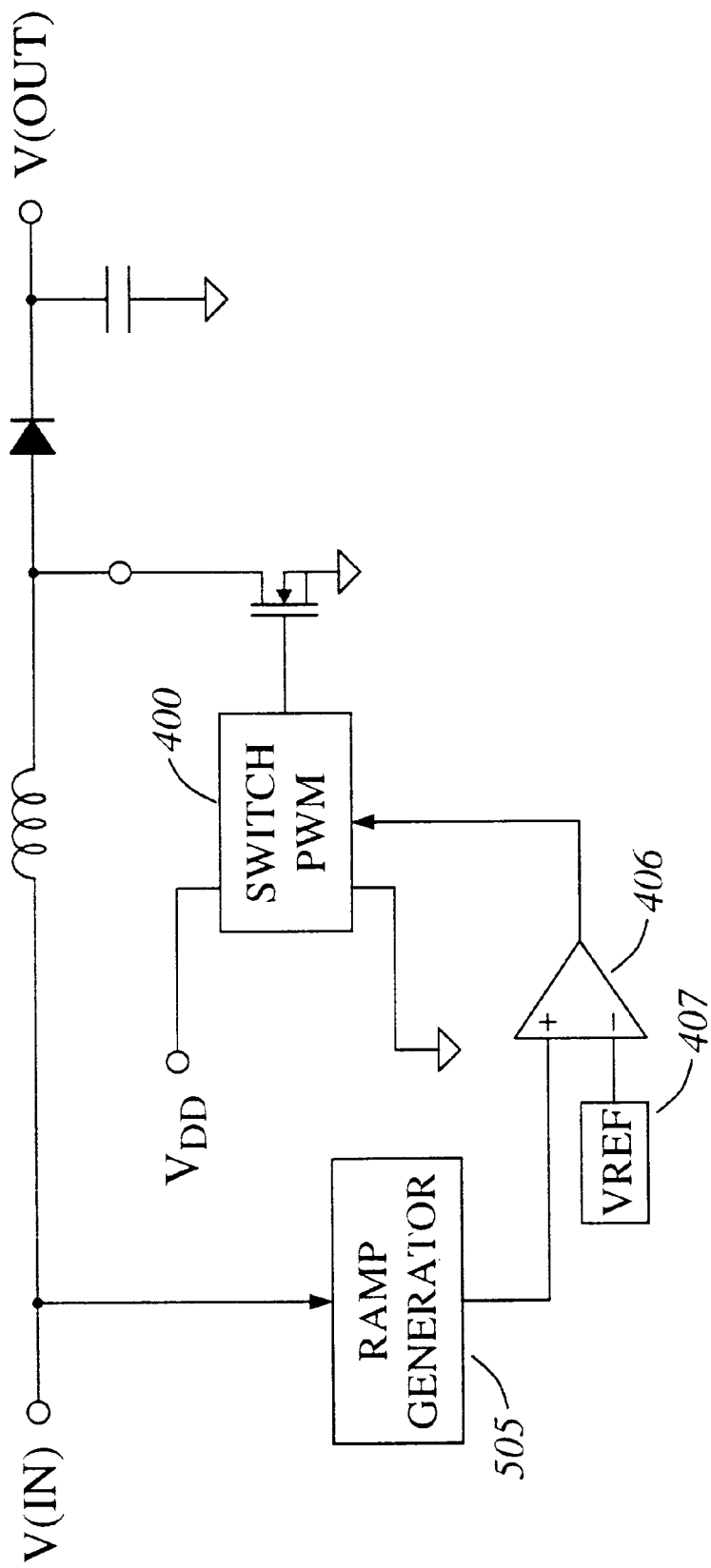
FIG. 5 is detailed schematic diagram of an EL lamp driver circuit in accordance with a second embodiment of the present invention in which feedforward regulation is employed.

Referring now to FIG. 5, there is shown an EL lamp driver circuit in accordance with a second embodiment of the present invention, in which feedforward regulation is employed. Like the circuit of FIG. 4, this circuit also eliminates the undesirable resistive divider prior art EL lamp driver circuits. The circuit of FIG. 5 accomplishes output voltage regulation by directly changing the pulse width duty cycle in a direction opposite to changes in the input voltage V(IN). As the input voltage increases, the slope of the ramp voltage signal at the output of a conventional ramp generator 505 is increased. As the slope of this ramp voltage signal increases, the voltage rises more quickly to the reference voltage V(REF) 407, and a comparator 406 changes state sooner, thus reducing the pulse width duty cycle of the switch PWM 400.

Since both of the foregoing embodiments of the EL lamp driver circuit of the present invention are constant power converters, the power being delivered to the load is substantially independent of the input voltage of the converter. This condition provides rough compensation for the effects of aging of an EL lamp panel. As EL lamp panels age, the brightness and capacitance values are diminished. One technique for compensating for the reduced brightness of an EL lamp panel involves increasing the AC voltage being applied to the EL lamp panel. In accordance with the foregoing equation 3, it can be seen that the output voltage of the present EL lamp driver changes as the inverse of the square root of the lamp capacitance. Although this change may not completely compensate for the loss of brightness of an aging EL lamp panel, it does serve to increase the output voltage during aging to thereby provide some degree of compensation.

We claim:

1. A regulator circuit for indirectly regulating the output voltage of a DC-DC converter of the type having an energy storage inductor and employed to power a substantially constant load, the regulator circuit comprising:

a pulse width modulator coupled to a source of DC voltage for providing a periodic on-time pulse;

switch means coupled to the pulse width modulator and responsive to the on-time pulse for conducting an increasing current during the duration thereof; and a sense and compare circuit coupled for sensing the current conducted through the switch means and flowing through the energy storage inductor to generate a sense voltage, for directly comparing the sense voltage to a DC reference voltage of substantially constant value, and for initiating termination of said periodic on-time pulse at such time as the sense voltage reaches the DC reference voltage.

2. A regulator circuit as in claim 1 wherein said switch means comprises a field effect transistor.

3. A regulator circuit as in claim 1 wherein said switch means comprises a sense field effect transistor.

4. A regulator circuit as in claim 1 wherein said switch means comprises a bipolar transistor switch.

5. A regulator circuit as in claim 1 wherein said sense and compare circuit includes a non-inverting amplifier circuit.

6. A regulator circuit for indirectly regulating the output voltage of a DC-DC converter employed to power a substantially constant load, the regulator circuit comprising:

a pulse width modulator coupled to a source of DC voltage for providing a periodic on-time pulse;

switch means coupled to the pulse width modulator and responsive to the on-time pulse for conducting an increasing current during the duration thereof; and circuit means coupled to the switch means for sensing a DC input voltage, for generating a ramp voltage having a slope that increases by a predetermined amount as the DC input voltage increases, for directly comparing said ramp voltage with a DC reference voltage of substantially constant value, and for initiating termination of said periodic on-time pulse at such time as said ramp voltage reaches the DC reference voltage.

7. A regulator circuit as in claim 6 wherein said switch means comprises a field effect transistor.

8. A regulator circuit as in claim 6 wherein said switch means comprises a sense field effect transistor.

9. A regulator circuit as in claim 6 wherein said switch means comprises a bipolar transistor switch.

10. A method for indirectly regulating the output voltage of a DC-DC converter of the type having an energy storage inductor and employed to power a substantially constant load, the method comprising:

providing a pulse width modulator coupled to a source of DC voltage for providing a periodic on-time pulse;

providing a switch means coupled to the pulse width modulator and responsive to the on-time pulse for conducting an increasing current during the duration thereof;

sensing the current conducted through the switch means and flowing through the energy storage inductor;

generating a sense voltage that is proportional to the sensed current;

directly comparing the sense voltage to a DC reference voltage of substantially constant value; and initiating termination of said periodic on-time pulse at such time as the sense voltage reaches the DC reference voltage.

11. A method for indirectly regulating the output voltage of a DC-DC converter employed to power a substantially constant load, the method comprising:

providing a pulse width modulator coupled to a source of DC voltage for providing a periodic on-time pulse;

providing a switch means coupled to the pulse width modulator and responsive to the on-time pulse for conducting an increasing current during the duration thereof;

sensing a DC input voltage;

generating a ramp voltage having a slope that increases by a predetermined amount as the DC input voltage increases;

directly comparing said ramp voltage with a DC reference voltage of substantially constant value; and initiating termination of said periodic on-time pulse at such time as said ramp voltage reaches the DC reference voltage.

12. A regulator circuit as in claim 1, wherein said sense and compare circuit comprises:

current sensing means for generating said sense voltage, said sense voltage being proportional to the current conducted through the switch means;

reference voltage generation means for generating said DC reference voltage of substantially constant value; and voltage comparison means having an output coupled to said pulse width modulator, the voltage comparison means being operative for directly comparing the sense voltage to the DC reference voltage and for initiating termination of said periodic on-time pulse at such time as the sense voltage reaches the DC reference voltage.

* * * * *